United States Patent
Na et al.

(10) Patent No.: US 11,485,501 B2
(45) Date of Patent: Nov. 1, 2022

(54) DRONE, PARACHUTE KIT FOR DRONES, AND METHOD OF CONTROLLING DRONES

(71) Applicant: Do Hyun Na, Seoul (KR)

(72) Inventors: Do Hyun Na, Seoul (KR); Young San Shin, Seoul (KR); Jin Hwan Jun, Goyang-si (KR); Kyung Pyo Kang, Goyang-si (KR); Hyeon Jun Na, Gwangju (KR); Se Jin Yoon, Seoul (KR); Young Hyun Na, Goyang-si (KR)

( * ) Notice: Subject to any disclaimer, the term of this patent is extended or adjusted under 35 U.S.C. 154(b) by 469 days.

(21) Appl. No.: 16/657,383

(22) Filed: Oct. 18, 2019

(65) Prior Publication Data

US 2021/0031930 A1 Feb. 4, 2021

(30) Foreign Application Priority Data

Aug. 1, 2019 (KR) .................. 10-2019-0093990

(51) Int. Cl.
| | |
|---|---|
| *B64D 17/62* | (2006.01) |
| *B64C 39/02* | (2006.01) |
| *B64D 41/00* | (2006.01) |
| *B64D 17/70* | (2006.01) |
| *B64D 17/72* | (2006.01) |
| *B60L 58/12* | (2019.01) |
| *B64D 17/54* | (2006.01) |

(52) U.S. Cl.
CPC .............. *B64D 17/62* (2013.01); *B60L 58/12* (2019.02); *B64C 39/024* (2013.01); *B64D 17/54* (2013.01); *B64D 17/70* (2013.01); *B64D 17/72* (2013.01); *B64D 41/00* (2013.01); *B60L 2200/10* (2013.01); *B64C 2201/042* (2013.01); *B64C 2201/185* (2013.01)

(58) Field of Classification Search
CPC ... B64C 2201/185; B64C 17/80; B64C 17/72; B64C 17/70; B64C 17/54; B64C 17/62
See application file for complete search history.

(56) References Cited

U.S. PATENT DOCUMENTS

| | | | |
|---|---|---|---|
| 9,145,212 B1 * | 9/2015 | Wei | B64D 17/80 |
| 10,717,524 B1 * | 7/2020 | Boyes | B64C 27/08 |
| 2016/0318615 A1 * | 11/2016 | Pick | B64D 17/54 |

(Continued)

FOREIGN PATENT DOCUMENTS

| | | |
|---|---|---|
| KR | 10-1723743 B1 | 4/2017 |
| KR | 10-1772570 B1 | 9/2017 |

(Continued)

OTHER PUBLICATIONS

Communication dated Jun. 18, 2020, issued by the Korean Patent Office in counterpart Korean Application No. 10-2019-0093990.

*Primary Examiner* — Joshua J Michener
*Assistant Examiner* — Arfan Y. Sinaki
(74) *Attorney, Agent, or Firm* — Sughrue Mion, PLLC

(57) ABSTRACT

A drone includes a drone body, a drone body battery provided in the drone body and responsible for supplying power to the drone body, a parachute kit detachably coupled to the drone body and including a parachute therein, a battery detector provided in the parachute kit and responsible for checking the state of the drone body battery, and a parachute controller for controlling the parachute kit depending on the state of the drone body battery detected by the battery detector.

9 Claims, 8 Drawing Sheets

(56) References Cited

U.S. PATENT DOCUMENTS

| | | | |
|---|---|---|---|
| 2016/0332738 A1* | 11/2016 | Hiisilä | F41A 19/58 |
| 2016/0340049 A1* | 11/2016 | Ferreyra | B64D 17/80 |
| 2016/0347462 A1* | 12/2016 | Clark | B64C 39/024 |
| 2017/0144562 A1* | 5/2017 | Thomas | B60L 58/12 |
| 2017/0225792 A1* | 8/2017 | Wang | B64C 39/024 |
| 2017/0313433 A1* | 11/2017 | Ozaki | B64D 17/80 |
| 2018/0065745 A1* | 3/2018 | Bash | B64C 39/024 |
| 2018/0162552 A1* | 6/2018 | Vawter | B64C 29/0016 |
| 2020/0033854 A1* | 1/2020 | Jeong | B64D 17/62 |
| 2020/0198790 A1* | 6/2020 | Yagihashi | B64D 25/00 |
| 2021/0206497 A1* | 7/2021 | Yagihashi | B64D 17/80 |

FOREIGN PATENT DOCUMENTS

| | | |
|---|---|---|
| KR | 10-2018-0000639 A | 1/2018 |
| KR | 10-2019-0031302 A | 3/2019 |
| WO | 2018/190319 A1 | 10/2018 |

* cited by examiner

10

DRONE, PARACHUTE KIT FOR DRONES, AND METHOD OF CONTROLLING DRONES

CROSS-REFERENCE TO RELATED APPLICATION

This application claims priority to Korean Patent Application No. 10-2019-0093990, filed on Aug. 1, 2019 in the Korean Intellectual Property Office, the disclosure of which is incorporated herein by reference.

BACKGROUND OF THE DISCLOSURE

Field of the Disclosure

The present disclosure relates to a drone, a parachute kit for drones, and a method of controlling drones. More specifically, the drone of the present disclosure is configured so that, when the drone is unable to fly because the power of the parachute kit capable of being attached to or detached from the drone and the power of a drone body are cut off or completely exhausted, a parachute is unfolded by spring elasticity or compressed air. Accordingly, breakage of the drone may be prevented, and damage caused by drone crashes may be minimized.

Description of the Related Art

The present disclosure relates to a drone and a parachute kit for drones.

In the case of conventional drones, when the power of a drone body is discharged or cut off by external factors during flight, the drone immediately crashes to the ground. Consequentially, in addition to breakage of the drone, human or property damage may occur at a place where the drone collides.

In addition, even in the case of a drone equipped with a parachute, it is difficult to implement an operation that allows the parachute to be unfolded at a proper time to prevent the drone from falling. In addition, the parachute does not spread evenly, making it difficult for the drone to land safely.

In addition, even in the case of a drone equipped with a parachute, when the power of a drone body is discharged or cut off by unexpected external factors such as lightning or electromagnetic fields, the parachute fails to be unfolded, resulting in a drone crash.

RELATED ART DOCUMENTS

Patent Documents (Patent Document 1) Korean Patent No. 10-1772570 (SYSTEM FOR PREVENTING DRONE FALL USING VARIABLE-PITCH PROPELLER)

SUMMARY OF THE DISCLOSURE

Therefore, the present disclosure has been made in view of the above problems, and it is an object of the present disclosure to provide a drone, a parachute kit for drones, and a method of controlling drones. According to the present disclosure, the drone is configured so that, when the drone is unable to fly because the power of the parachute kit capable of being attached to or detached from the drone and the power of a drone body are cut off or completely exhausted, a parachute is unfolded by spring elasticity or compressed air. Accordingly, breakage of the drone may be prevented, and damage caused by drone crashes may be minimized.

It is another object of the present disclosure to provide a drone, a parachute kit for drones, and a method of controlling drones. According to the present disclosure, when a remaining charge of a drone body battery is less than or equal to a preset value, and when a drone is capable of reaching a destination using a total charge of the remaining charge of the drone body battery and a charge of a parachute kit battery, electricity is supplied from the parachute kit battery to the drone body battery to ensure safe flight of the drone to the destination.

It is still another object of the present disclosure to provide a drone, a parachute kit for drones, and a method of controlling drones. According to the present disclosure, the drone is equipped with an emergency spring that allows a parachute to be mechanically unfolded so that the drone may safely land even when a battery is discharged due to unexpected lightning or electromagnetic pulses (EMPs).

It is still another object of the present disclosure to provide a drone, a parachute kit for drones, and a method of controlling drones. In the drone of the present disclosure, a parachute is connected to a plurality of points of a parachute cover by wires so that the parachute may be evenly spread and the drone may land safely.

It is still another object of the present disclosure to provide a drone, a parachute kit for drones, and a method of controlling drones. In the drone of the present disclosure, the positions of a drone body and the parachute kit and the altitude of the drone are measured to unfold a parachute at the optimal position and altitude. This mode of operation allows the drone to land safely.

It is yet another object of the present disclosure to provide a drone, a parachute kit for drones, and a method of controlling drones. According to the present disclosure, the unfolding structure of a parachute is relatively simple, which increases the stability of the drone, lowers manufacturing costs, and allows weight reduction of the drone.

The above objects and various advantages of the present disclosure will be clearly understood by those skilled in the art through preferred embodiments of the present disclosure.

In accordance with one aspect of the present disclosure, provided is a drone including a drone body; a drone body battery provided in the drone body and responsible for supplying power to the drone body; a parachute kit detachably coupled to the drone body and including a parachute therein; a battery detector provided in the parachute kit and responsible for checking a state of the drone body battery; and a parachute controller for controlling the parachute kit depending on a state of the drone body battery detected by the battery detector.

In addition, the parachute kit may include a parachute kit battery for supplying electricity to the parachute kit, wherein the parachute kit battery is connected to the drone body battery in a wired or wireless manner.

In addition, in a case wherein a charge of the drone body battery detected by the battery detector is less than or equal to a preset value, when the parachute controller determines that the drone is capable of reaching a destination using a total charge of a remaining charge of the drone body battery and a charge of the parachute kit battery, the parachute controller may perform control so that electricity is supplied from the parachute kit battery to the drone body battery; and when the parachute controller determines that the drone is incapable of reaching the destination using the total charge, the parachute controller may perform control so that a parachute of the parachute kit is unfolded.

In addition, the parachute kit may include a parachute chamber in which a parachute is disposed; a parachute cover for covering one side of the parachute chamber; a parachute support disposed on the other side of the parachute chamber and responsible for supporting the parachute; and a parachute pressurizer for selectively applying pressure to the parachute support, wherein, when the parachute controller receives a parachute unfolding command, or when a total charge of the parachute kit battery and the drone body battery is 0, the parachute pressurizer pressurizes the parachute support.

In addition, the parachute pressurizer may include a compressed air chamber for containing compressed air; a check valve disposed between the compressed air chamber and the parachute support; and a first servomotor for selectively opening and closing the check valve.

In addition, the parachute pressurizer may include a spring accommodating chamber for accommodating a compressed spring; a parachute support holder for selectively holding the parachute support so that the parachute support keeps the spring compressed; and a second servomotor for selectively rotating the parachute support holder, wherein, when the servomotor rotates the parachute support holder at a predetermined angle while the parachute support keeps the spring compressed, the spring is decompressed.

In addition, the first and second servomotors each may include an emergency spring, wherein, when the first and second servomotors are powered off, the emergency springs rotate rotating shafts of the first and second servomotors by moving the check valve or the parachute support holder so that the parachute is capable of being unfolded.

In addition, the parachute cover may include a plurality of partial covers, wherein the partial covers are coupled to a top rim of the parachute chamber in a fitting manner, and the partial covers are connected to each other so that the partial covers are separated by pressure generated by the parachute pressurizer.

In addition, the partial covers may be connected to the parachute by wires.

In addition, the parachute kit may include a position measuring unit and an altitude measuring unit, and the parachute controller may control the parachute kit so that the parachute is unfolded, upon determining, by the position measuring unit, that the parachute kit is located at an upper portion of the drone body.

In addition, when an altitude measured by the altitude measuring unit is less than or equal to a preset altitude, the parachute controller may control the parachute kit so that the parachute is unfolded even when the parachute kit is located at a lower portion of the drone body.

In accordance with another aspect of the present disclosure, provided is a parachute kit for drones, wherein the parachute kit is coupled to a drone body provided with a drone body battery, and includes a parachute kit body detachably coupled to the drone body and including a parachute therein; a parachute kit battery for supplying electricity to the parachute kit; a battery detector provided in the parachute kit body and responsible for checking a state of the drone body battery; and a parachute controller for controlling the parachute kit depending on the state of the drone body battery detected by the battery detector, wherein, upon determining that a drone is incapable of reaching a destination using a total charge of a remaining charge of the drone body battery and a charge of the parachute kit battery, when a total charge of the parachute kit battery and the drone body battery is 0, or when a parachute unfolding command is received from an external controller, the parachute controller performs control so that the parachute is unfolded.

In accordance with yet another aspect of the present disclosure, provided is a method of controlling drones, wherein the method controls a drone provided with a parachute kit detachably coupled to a drone body, and includes a step of checking a charge of a battery of the drone body; a step of determining whether the charge of the battery of the drone body is less than or equal to a predetermined value; a step of checking a charge of a battery of the parachute kit when the charge of the battery of the drone body is less than or equal to the predetermined value; a step of determining whether the drone is capable of reaching a destination using a total charge of a remaining charge of the battery of the drone body and a remaining charge of the battery of the parachute kit; and a step of performing control so that electricity is supplied from the parachute kit battery to the drone body battery upon determining that the drone is capable of reaching the destination using the total charge, and performing control so that a parachute of the parachute kit is unfolded upon determining that the drone is incapable of reaching the destination using the total charge.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSURE

Figure 1:
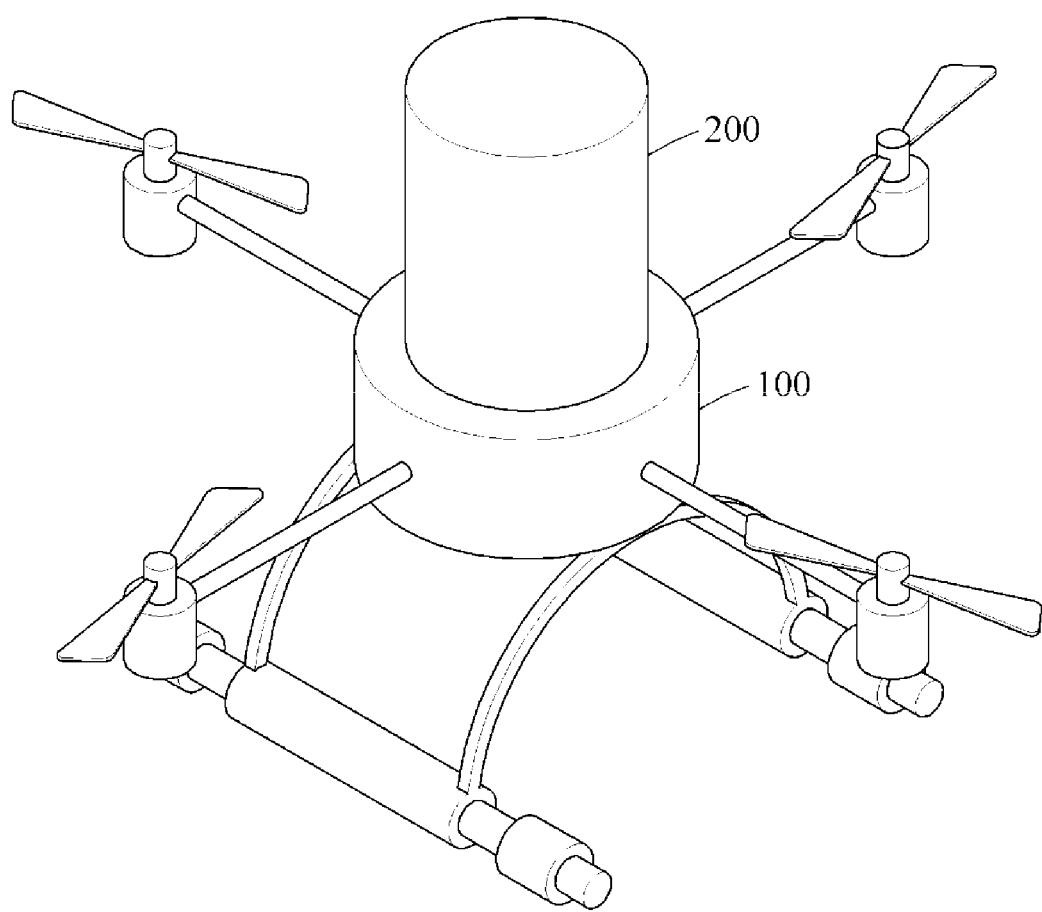
FIG. 1 is a drawing schematically showing a drone body and a parachute kit for drones according to a preferred embodiment of the present disclosure.
Figure 2:
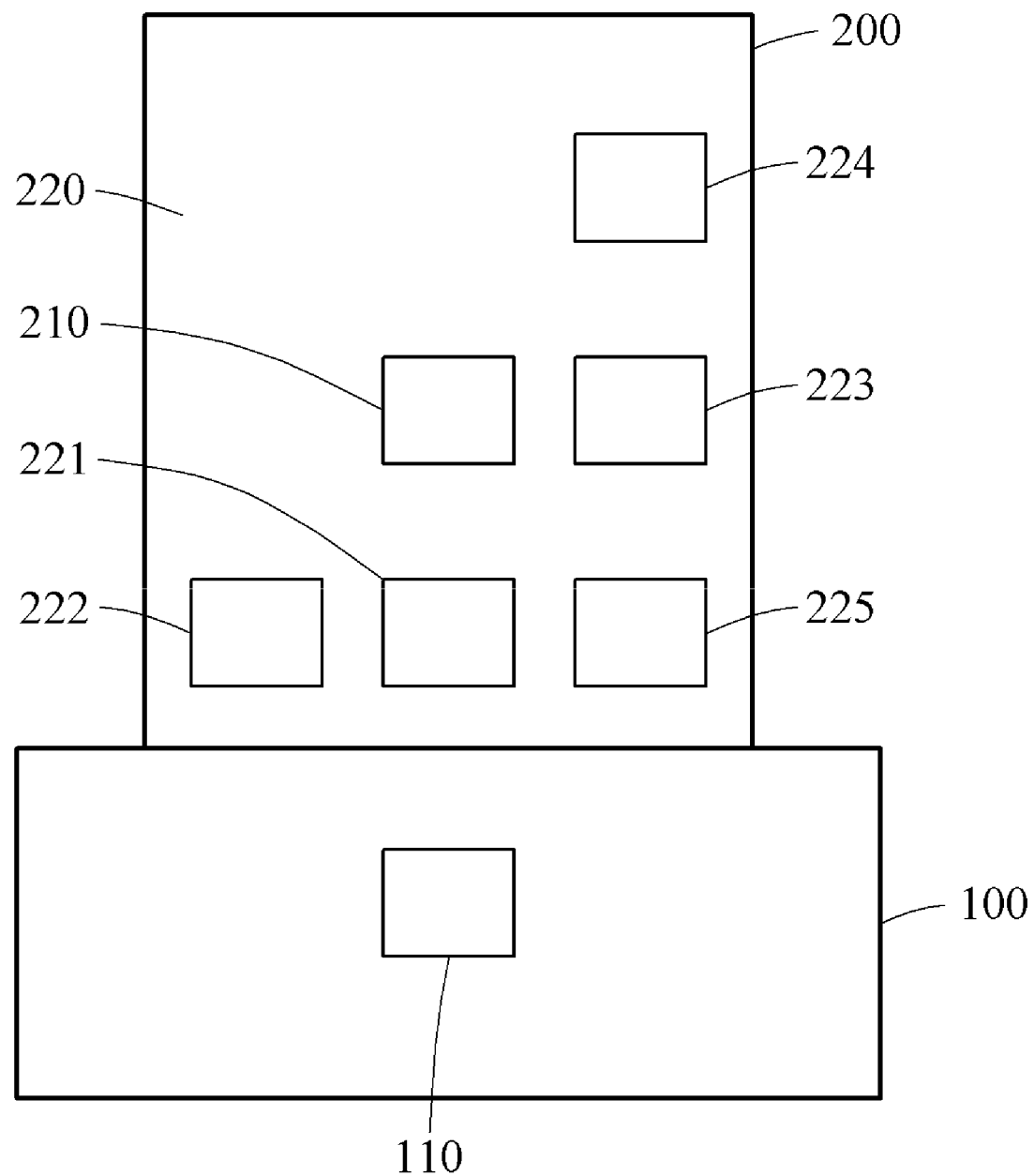
FIG. 2 is a drawing schematically showing the components of a drone body and a parachute kit for drones according to a preferred embodiment of the present disclosure.

Hereinafter, the present disclosure will be described in more detail with reference to the following preferred examples. However, these examples are provided for illustrative purposes only and should not be construed as limiting the scope and spirit of the present disclosure. In addition, it will be apparent to those skilled in the art that various changes and modifications may be made without departing from the spirit and scope of the present disclosure, and such changes and modifications are also within the scope of the appended claims.

Referring to FIGS. 1 to 7, a drone 10 according to a preferred embodiment of the present disclosure includes a drone body 100 and a parachute kit for drones 200, and the drone body 100 and the parachute kit for drones 200 are detachably coupled to each other.

The parachute kit 200 is preferably located at the center of the upper portion of the drone body 100, but the position of the parachute kit 200 is not limited thereto. In addition, the parachute kit 200 is preferably arranged so as not to interfere with a plurality of rotating drone wings.

The shape and size of the drone body 100 may vary according to a user purpose, etc., and the drone body 100 includes a drone body battery 110 for supplying power to the drone body 100.

The parachute kit 200 is detachably coupled to the drone body 100 and includes a parachute 210 therein.

In addition, the parachute kit 200 includes a battery detector 221 for checking the state of the drone body battery 110 and a parachute controller 222 for controlling the parachute kit 200. The parachute kit 200 may be controlled according to the state of the drone body battery 110 detected by the battery detector 221. A parachute kit battery 225 for supplying power to the parachute kit 200 is provided in the parachute kit 200, and the parachute kit battery 225 is connected to the drone body battery 110 in a wired or wireless manner.

When a charge of the drone body battery 110 detected by the battery detector 221 is less than or equal to a preset value, the parachute controller 222 checks a charge of the parachute kit battery 225 and determines whether the drone is capable of reaching a destination using a sum (hereinafter referred to as total charge) of a remaining charge of the drone body battery 110 and the charge of the parachute kit battery 225. In this case, when the parachute controller 222 determines that the drone is capable of reaching the destination using the total charge, electricity is supplied from the parachute kit battery 225 to the drone body battery 110. When the parachute controller 222 determines that the drone is incapable of reaching the destination using the total charge, the parachute controller 222 performs control so that the parachute 210 of the parachute kit 200 is unfolded.

Alternatively, the parachute controller 222 checks commands transmitted from an external controller connected to the parachute kit 200 in a wired or wireless manner, and the parachute controller 222 determines whether a parachute unfolding command has been received. When the parachute unfolding command has been received, the parachute controller 222 performs control so that the parachute 210 is unfolded. When the command has not been received, the parachute controller 222 may continue to check commands transmitted from the external controller.

Figure 3:
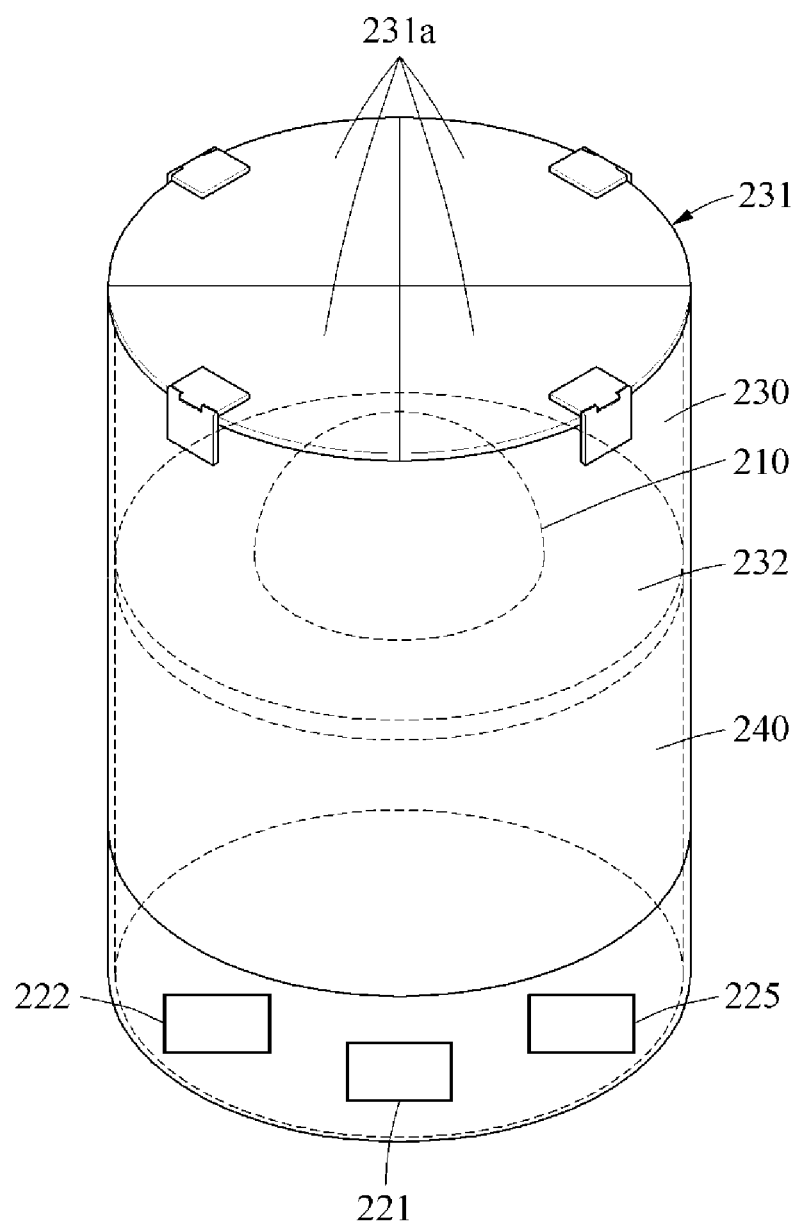
FIG. 3 is a drawing schematically showing a parachute kit according to a preferred embodiment of the present disclosure.

Referring to FIG. 3, the parachute kit 200 includes a parachute chamber 230 in which the parachute 210 is disposed, a parachute cover 231 for covering one side of the parachute chamber 230, a parachute support 232 disposed on the other side of the parachute chamber 230 and responsible for supporting the parachute 210, and a parachute pressurizer 240 for selectively applying pressure to the parachute support 232.

When the parachute controller 222 determines that the drone is incapable of reaching a destination using a total charge of a remaining charge of the drone body battery 110 and a charge of the parachute kit battery 225, and when the parachute controller 222 receives a parachute unfolding command, the parachute pressurizer 240 may apply pressure to the parachute support 232 so that a parachute is unfolded out of the parachute chamber 230.

Alternatively, when the charge of each of the parachute kit battery 225 and the drone body battery 110 suddenly drops to zero due to an EMP attack or the like, the parachute pressurizer 240 may apply pressure to the parachute support 232 so that a parachute is unfolded out of the parachute chamber 230.

Figure 4:
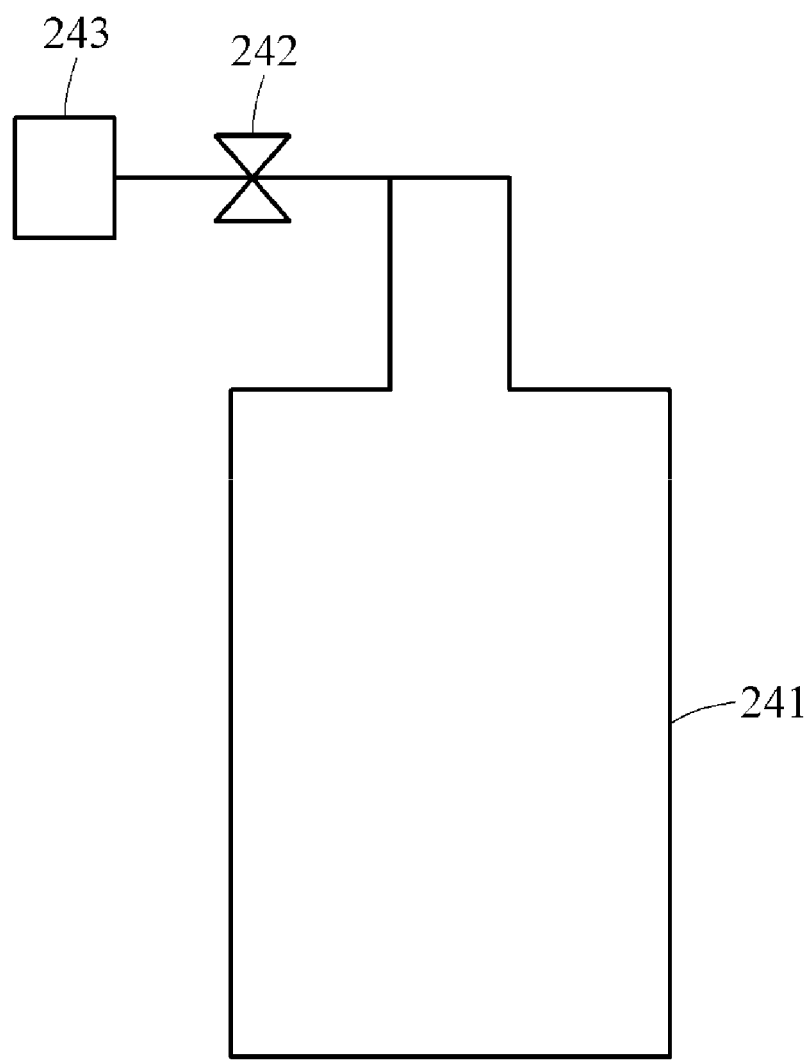
FIG. 4 shows an embodiment of a parachute pressurizer according to a preferred embodiment of the present disclosure.

In this case, the parachute pressurizer 240 may be configured in a variety of ways. In a preferred embodiment of the present disclosure, as shown in FIG. 4, the parachute pressurizer 240 may be configured to pressurize the parachute support 232 using compressed air.

For this purpose, the parachute pressurizer 240 includes a compressed air chamber 241 for containing compressed air, a check valve 242 disposed between the compressed air chamber 241 and the parachute support 232, and a first servomotor 243 for selectively opening and closing the check valve 242. When a parachute needs to be unfolded, the first servomotor 243 is controlled so that the locked check valve 242 is opened, and compressed air contained in the compressed air chamber 241 is released from the compressed air chamber 241. At this time, the parachute support 232 is pressurized by the generated force.

In this case, the first servomotor 243 may include an emergency spring. When the charge of the parachute kit battery 225 suddenly drops to zero due to an EMP attack or the like, or when the first servomotor 243 is powered off, the emergency spring rotates the rotating shaft of the first servomotor 243 by moving the check valve 242 so that the parachute 210 is capable of being unfolded. Accordingly, even when the charge of the parachute kit battery 225 suddenly drops to zero due to an EMP attack or the like, or even when the first servomotor 243 is powered off, the parachute may be mechanically unfolded.

Figure 5:
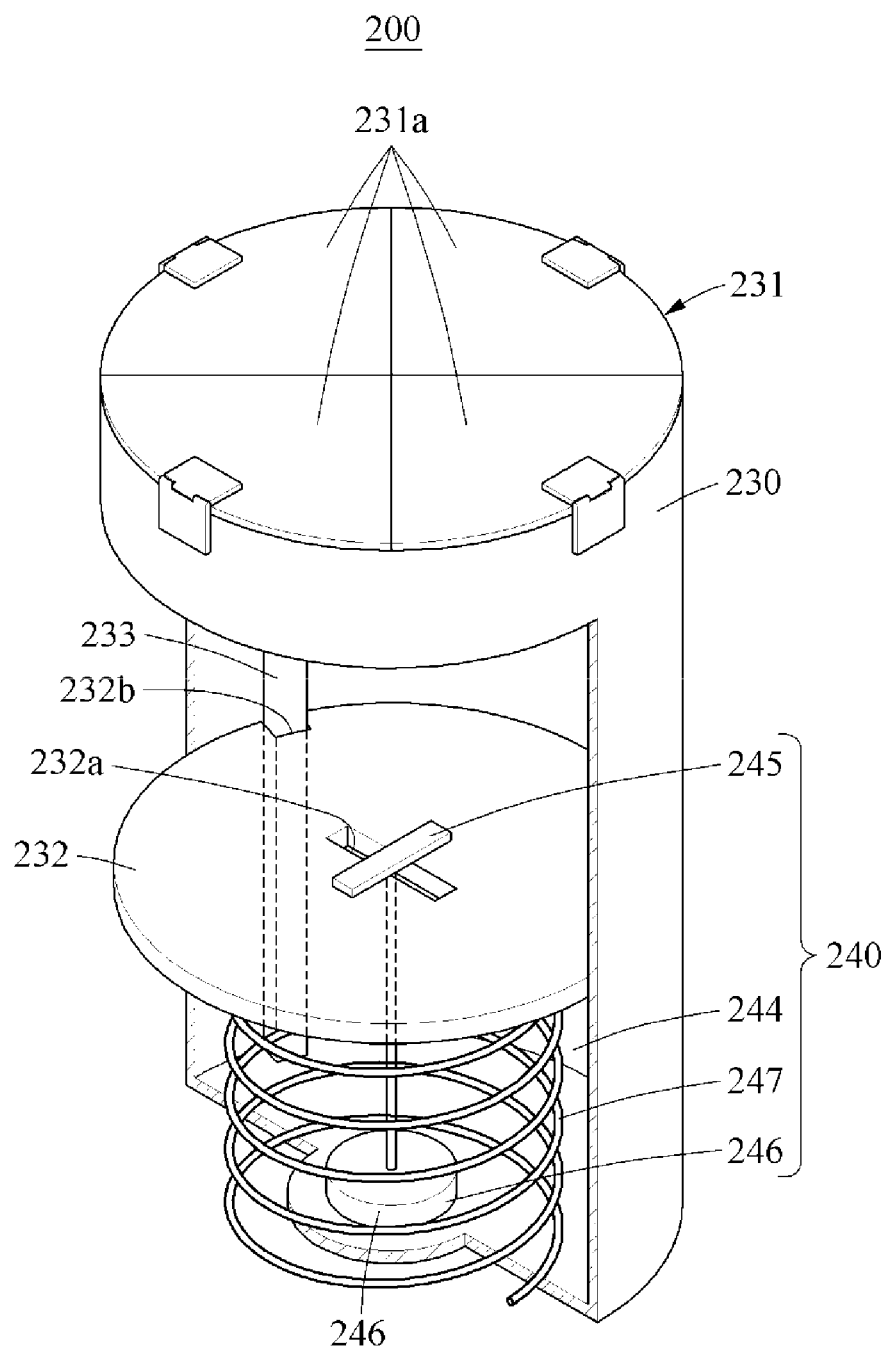
FIG. 5 shows another embodiment of a parachute pressurizer according to a preferred embodiment of the present disclosure.
Figure 6:
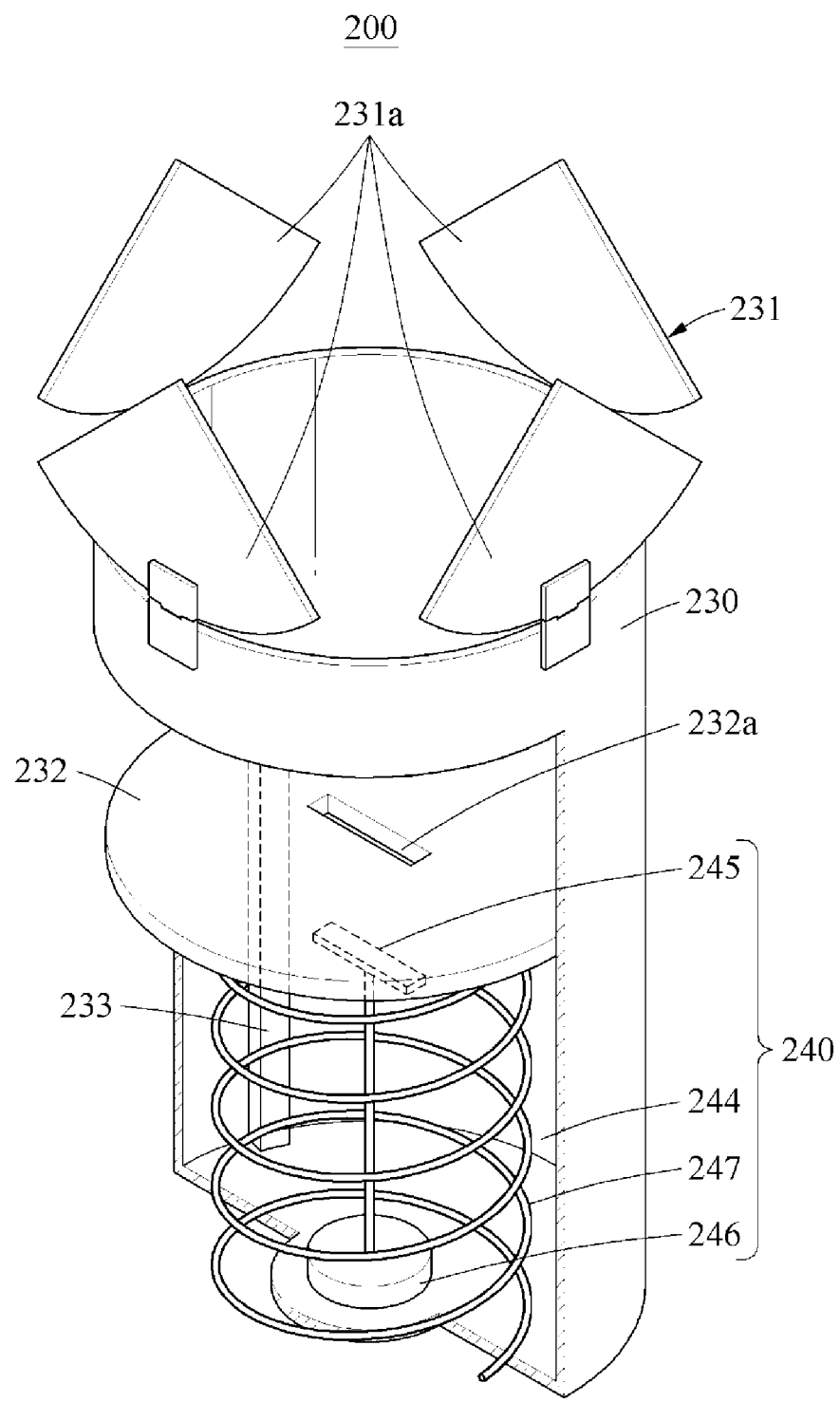
FIG. 6 shows a state wherein a parachute cover is opened in another embodiment of a parachute pressurizer according to a preferred embodiment of the present disclosure.

In addition, according to another preferred embodiment of the present disclosure, as shown in FIGS. 5 and 6, the parachute pressurizer 240 may be configured to pressurize the parachute support 232 using elasticity of the compressed spring 247.

For this purpose, the parachute pressurizer 240 includes a spring accommodating chamber 244 for accommodating the compressed spring 247, a parachute support holder 245 for selectively holding the parachute support 232 so that the parachute support 232 keeps a spring 247 compressed, and a second servomotor 246 for selectively rotating the parachute support holder 245.

In a state wherein the parachute support 232 keeps the spring 247 compressed, when a parachute needs to be unfolded, the second servomotor 246 rotates the parachute support holder 245 at a predetermined angle so that the spring 247 is decompressed. At this time, the parachute support 232 may be pressurized by elasticity generated by the spring 247.

The parachute pressurizer 240 may be configured in various forms so that the parachute support holder 245 selectively holds the parachute support 232. In a preferred embodiment of the present disclosure, a parachute support hole 232a is formed in the center of the parachute support 232, one end of the parachute support holder 245 is connected to the second servomotor 246 so that the parachute support holder 245 is rotated by the second servomotor 246, and the other end of the parachute support holder 245 is configured so that the parachute support holder 245 selectively passes through the parachute support hole 232a.

Under normal conditions, as shown in FIG. 5, to keep the spring 247 compressed, the other end of the parachute support holder 245 does not pass through the parachute support hole 232a and is positioned perpendicular to the parachute support hole 232a. When the parachute 210 needs to be unfolded, as shown FIG. 6, the parachute support holder 245 is rotated by the second servomotor 246, the other end of the parachute support holder 245 passes through the parachute support hole 232a, and the spring 247 is decompressed. As a result, the parachute support 232 is raised.

In addition, one or more guide portions 233 for guiding the parachute support 232 are formed in a protruding shape in a longitudinal direction on the inner circumferential surface of the parachute chamber 230. The guide portions 233 allow the parachute support 232 to move up and down along the inner circumferential surface of the parachute chamber 230 without departing from the parachute chamber 230. One or more parachute support guides 232b corresponding to the guide portions 233 are formed in the form of a groove or hole on the outer circumference of the parachute support 232, and the guide portions 233 may pass through the parachute support guides 232b.

In this case, the guide portions 233 may be formed in the form of a groove on the inner circumferential surface of the parachute chamber 230, and the parachute support guides 232b may be formed to be protruded. The parachute support guides 232b may pass through the guide portions 233 to guide the parachute support 232.

In addition, the second servomotor 246 includes an emergency spring. When the charge of the parachute kit battery 225 suddenly drops to zero due to an EMP attack or the like, or when the second servomotor 246 is powered off, the emergency spring rotates the rotating shaft of the second servomotor 246 by moving the parachute support holder 245 so that the parachute 210 is capable of being unfolded. Accordingly, even when the charge of the parachute kit battery 225 suddenly drops to zero due to an EMP attack or the like, or even when the second servomotor 246 is powered off, the parachute may be mechanically unfolded.

In addition, the parachute cover 231 includes a plurality of partial covers 231a. Each of the partial covers 231a is coupled to the top rim of the parachute chamber 230 in a fitting manner so that the partial covers 231a are rotatable about the top rim of the parachute chamber 230. The partial covers 231a are separated from each other by pressure generated by the parachute pressurizer 240 and are separated from the parachute cover 231. As a result, the parachute 210 may be unfolded out of the parachute chamber 230.

In this case, the partial covers 231a are each connected to the outer circumference of the parachute 210 by wires 231b at regular intervals. With this configuration, the parachute 210 may be evenly spread when the parachute 210 is unfolded, ensuring safe landing of the drone body 100.

For example, when the parachute pressurizer 240 applies force to the parachute support 232, the parachute 210 on the parachute support 232 is exposed to the outside while pushing the partial covers 231a. At this time, the partial covers 231a are separated from each other and separated from the parachute chamber 230. In this case, due to the weight of the partial covers 231a connected to the parachute 210 via wires, the parachute 210 may be evenly spread without partial unfolding or tilting.

The parachute kit 200 may further include a position measuring unit 224 for measuring the position of the parachute kit 200 with respect to the drone body 100 and an altitude measuring unit 223 for measuring the altitude of the parachute kit 200. The parachute controller 222 controls the parachute kit 200 so that the parachute 210 is unfolded, upon determining, by the position measuring unit 224, that the parachute kit 200 is located at an upper portion of the drone body 100. Accordingly, the parachute 210 may be stably unfolded, which prevents the drone body 100 from falling or breaking.

Figure 7:
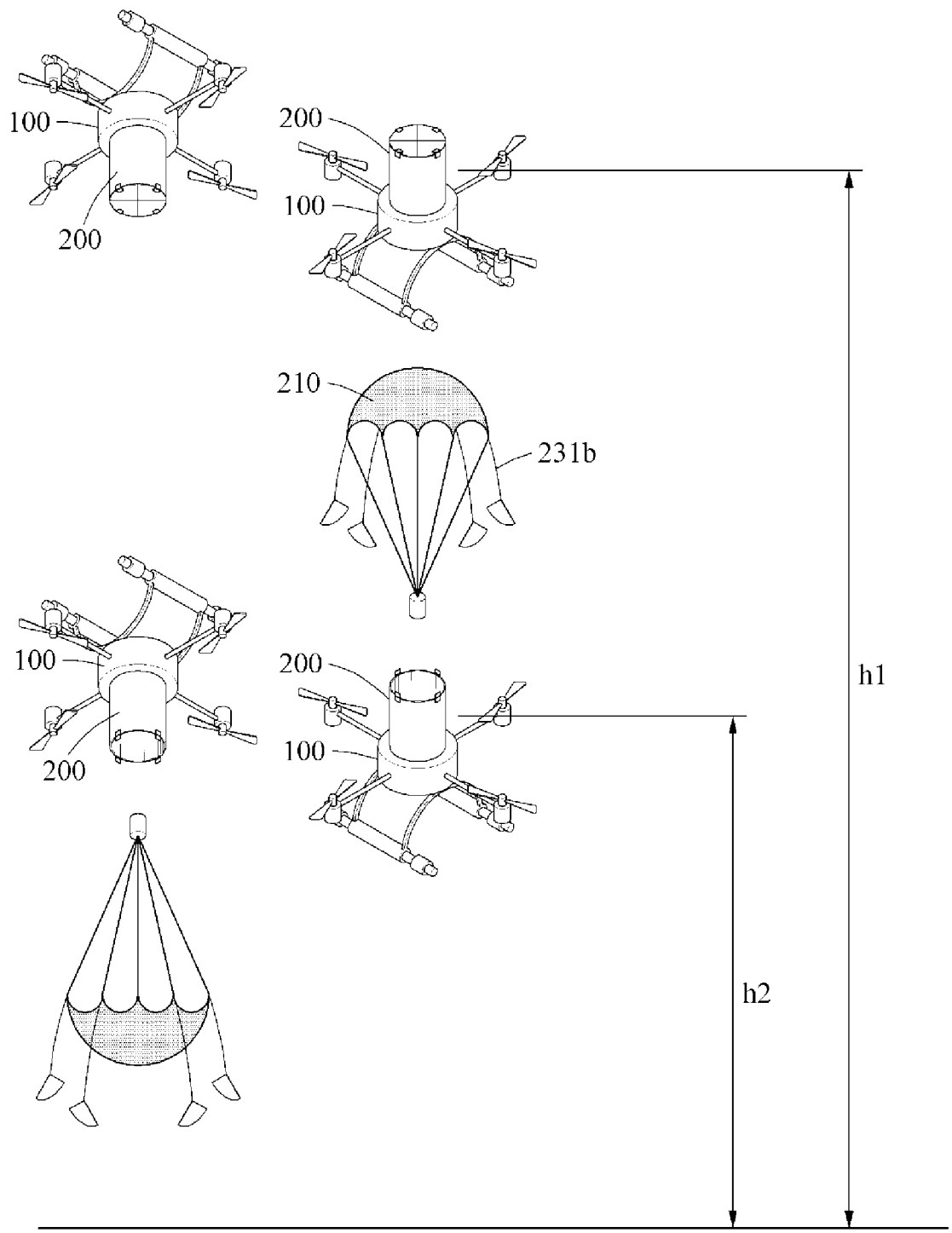
FIG. 7 includes drawings schematically showing operation manners of a drone and a parachute kit for drones according to a preferred embodiment of the present disclosure depending on altitude.

In addition, referring to FIG. 7, when the altitude of the parachute kit 200 measured by the altitude measuring unit 223 is greater than or equal to a preset altitude (e.g., h1), the parachute controller 222 controls the parachute kit 200 so that the parachute 210 is not unfolded regardless of the position of the parachute kit 200. When the altitude of the parachute kit 200 measured by the altitude measuring unit 223 is less than or equal to a preset altitude (e.g., h2), the parachute controller 222 controls the parachute kit 200 so that the parachute 210 is unfolded. In particular, when the altitude of the parachute kit 200 is less than or equal to a preset altitude (e.g., h2), even when the parachute kit 200 is located at a lower portion of the drone body 100, the parachute controller 222 controls the parachute kit 200 so that the parachute 210 is unfolded. Thus, this mode of operation ensures safe landing of the drone body 100.

Figure 8:
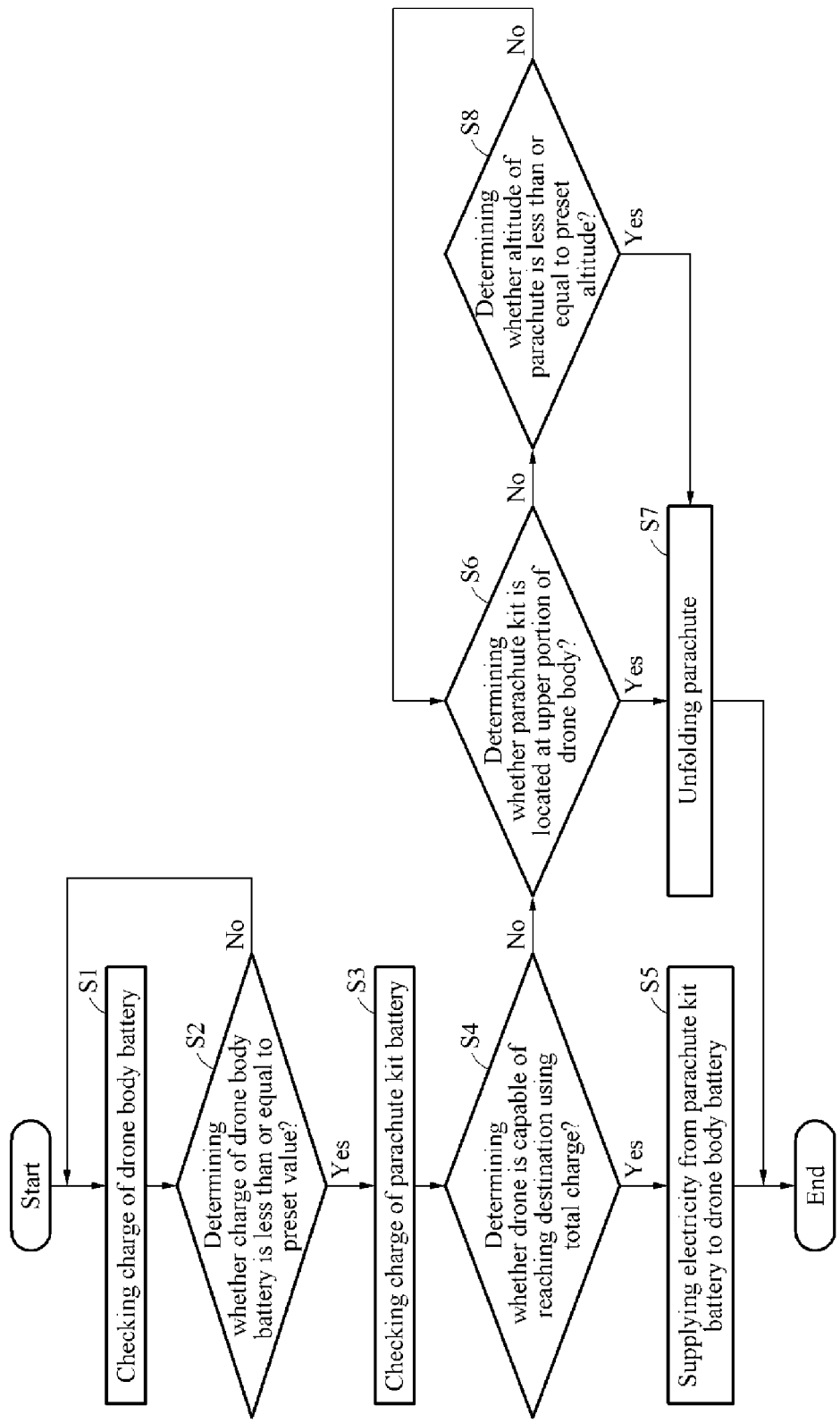
FIG. 8 is a flowchart according to a preferred embodiment of the present disclosure.

A process of unfolding a parachute from the parachute kit coupled to the drone body according to a preferred embodiment of the present disclosure will be described with reference to FIG. 8.

First, the battery detector 221 checks the charge of the drone body battery 110 (step S1 of checking the charge of a drone body battery) and determines whether the charge of the drone body battery 110 is less than or equal to a predetermined value (step S2 of determining whether the charge of the drone body battery is less than or equal to a predetermined value). When the charge of the drone body battery 110 is greater than the predetermined value, the process returns to S1 and the battery detector 221 checks the charge of the drone body battery 110. When the charge of the drone body battery 110 is less than or equal to the predetermined value, the battery detector 221 checks the charge of the parachute kit battery 225 (step S3 of checking the charge of a parachute kit battery).

Next, it is determined whether the drone is capable of reaching a destination using a sum (i.e., total charge) of a remaining charge of the drone body battery 110 and a charge of the parachute kit battery 225 (step S4 of determining whether the drone is capable of reaching a destination using a total charge). When it is determined that the drone is capable of reaching the destination using the total charge, electricity is supplied from the parachute kit battery 225 to the drone body battery 110 (step S5 of supplying electricity from the parachute kit battery to the drone body battery). When it is determined that the drone is incapable of reaching the destination using the total charge, the parachute 210 of the parachute kit 200 is unfolded (step S7 of unfolding the parachute).

More specifically, in step S4, when it is determined that the drone is incapable of reaching the destination using the total charge, before step S7, the position measuring unit 224 measures the position of the parachute kit 200 with respect to the drone body 100 and determines whether the parachute kit 200 is located at an upper portion of the drone body 100 (step S6 of determining whether the parachute kit is located at an upper portion of the drone body). When it is determined that the parachute kit 200 is located at an upper portion of the drone body 100, this indicates that the parachute 210 is capable of being unfolded stably, and thus, the parachute 210 is unfolded (step S7). When it is determined that the parachute kit 200 is located at a lower portion or a side of the drone body 100 rather than at an upper portion of the drone body 100, it is determined whether the altitude of the parachute kit 200 is less than or equal to the preset altitude (step S8 of determining whether the altitude of the parachute is less than or equal to the preset altitude). Only when the altitude of the parachute kit 200 is less than or equal to the preset altitude, the parachute 210 is unfolded. When the altitude of the parachute kit 200 is greater than the preset altitude, the process returns to step S6 and the position of the parachute kit 200 is detected.

Alternatively, commands transmitted from an external controller connected to the parachute kit 200 in a wired or wireless manner are checked (S10, checking commands transmitted from an external controller), and whether a parachute unfolding command has been received is determined (S11, confirming whether a parachute unfolding command has been received). When the parachute unfolding command has been received, the parachute 210 is unfolded (S7). When the parachute unfolding command has not been received, the process returns to S10 and commands transmitted from the external controller are checked continuously.

In addition, in this embodiment, S6 and S8 may be performed before S7 as described above with reference to FIG. 8.

According to the present disclosure, a drone and a parachute kit for drones can be provided. The drone of the present disclosure is configured so that, when the drone is unable to fly because the power of the parachute kit capable of being attached to or detached from the drone and the power of a drone body are cut off or completely exhausted, a parachute is unfolded by spring elasticity or compressed air. Accordingly, breakage of the drone can be prevented, and damage caused by drone crashes can be minimized.

In addition, according to the present disclosure, a drone and a parachute kit for drones can be provided. According to the present disclosure, when a remaining charge of a drone body battery is less than or equal to a preset value, and when the drone is capable of reaching a destination using a total charge of the remaining charge of the drone body battery and a charge of a parachute kit battery, electricity is supplied from the parachute kit battery to the drone body battery to ensure safe flight of the drone to the destination.

In addition, according to the present disclosure, a drone and a parachute kit for drones can be provided. The drone of the present disclosure is equipped with an emergency spring that allows a parachute to be mechanically unfolded. Accordingly, the drone can safely land even when a battery is discharged due to unexpected lightning or electromagnetic pulses (EMPs).

In addition, according to the present disclosure, a drone and a parachute kit for drones can be provided. In the drone of the present disclosure, a parachute is connected to a plurality of points of a parachute cover by wires so that the parachute can be evenly spread and the drone can land safely.

In addition, according to the present disclosure, a drone and a parachute kit for drones can be provided. In the drone of the present disclosure, the positions of a drone body and the parachute kit and the altitude of the drone are measured to unfold a parachute at the optimal position and altitude. This mode of operation allows the drone to land safely.

In addition, according to the present disclosure, a drone and a parachute kit for drones can be provided. According to the present disclosure, the unfolding structure of a parachute is relatively simple, which increases the stability of the drone, lowers manufacturing costs, and allows weight reduction of the drone.

As described above, the present disclosure has been described with reference to preferred embodiments. However, those skilled in the art will appreciate that various modifications and changes can be made without departing from the spirit and scope of the disclosure as set forth in the following claims.

DESCRIPTION OF SYMBOLS

10: DRONE
100: DRONE BODY
110: DRONE BODY BATTERY
200: PARACHUTE KIT
210: PARACHUTE
220: PARACHUTE KIT BODY
221: BATTERY DETECTOR
222: PARACHUTE CONTROLLER
223: ALTITUDE MEASURING UNIT
224: POSITION MEASURING UNIT
225: PARACHUTE KIT BATTERY
230: PARACHUTE CHAMBER
231: PARACHUTE COVER
231A: PARTIAL COVERS
232: PARACHUTE SUPPORT
232A: PARACHUTE SUPPORT HOLE
232B: PARACHUTE SUPPORT GUIDES
233: GUIDE PORTIONS
240: PARACHUTE PRESSURIZER
241: COMPRESSED AIR CHAMBER
242: CHECK VALVE
243: FIRST SERVOMOTOR
244: SPRING ACCOMMODATING CHAMBER
245: PARACHUTE SUPPORT HOLDER
246: SECOND SERVOMOTOR
247: SPRING

What is claimed is:
1. A drone, comprising:
a drone body;
a drone body battery provided in the drone body and responsible for supplying power to the drone body;
a parachute kit detachably coupled to the drone body and comprising a parachute therein;
a battery detector provided in the parachute kit and responsible for checking a state of the drone body battery; and
a parachute controller for controlling the parachute kit depending on a state of the drone body battery detected by the battery detector,
wherein the parachute kit comprises:
a parachute chamber in which the parachute is disposed;
a parachute cover for covering one side of the parachute chamber;
a parachute support disposed on another side of the parachute chamber and responsible for supporting the parachute; and
a parachute pressurizer for selectively applying pressure to the parachute support,
wherein when the parachute controller receives a parachute unfolding command or when a total charge of the parachute kit battery and the drone body battery is 0, the parachute pressurizer pressurizes the parachute support, wherein the parachute pressurizer comprises:
a compressed air chamber for containing compressed air;
a check valve disposed between the compressed air chamber and the parachute support; and
a servomotor for selectively opening and closing the check valve.

2. The drone according to claim 1, wherein the parachute kit comprises the parachute kit battery for supplying electricity to the parachute kit,
wherein the parachute kit battery is connected to the drone body battery in a wired or wireless manner.

3. The drone according to claim 2, wherein, in a case that a charge of the drone body battery detected by the battery detector is less than or equal to a preset value,
when the parachute controller determines that the drone is capable of reaching a destination using a total charge of a remaining charge of the drone body battery and a charge of the parachute kit battery, the parachute controller performs control so that electricity is supplied from the parachute kit battery to the drone body battery; and
when the parachute controller determines that the drone is incapable of reaching the destination using the total charge, the parachute controller performs control so that the parachute of the parachute kit is unfolded.

4. The drone according to claim 3, wherein the parachute kit comprises a position measuring unit for measuring a position of the parachute kit and an altitude measuring unit for measuring an altitude of the parachute kit.

5. The drone according to claim 4, wherein, when the altitude measured by the altitude measuring unit is less than or equal to a preset altitude, the parachute controller controls the parachute kit so that the parachute is unfolded.

6. The drone according to claim 1, wherein the parachute cover comprises a plurality of partial covers, wherein the partial covers are coupled to a top rim of the parachute chamber in a fitting manner, and the partial covers are connected to each other so that the partial covers are separated by pressure generated by the parachute pressurizer.

7. The drone according to claim 6, wherein the partial covers are connected to the parachute.

8. A drone, comprising:
a drone body;
a drone body battery provided in the drone body and responsible for supplying power to the drone body;
a parachute kit detachably coupled to the drone body and comprising a parachute therein;
a battery detector provided in the parachute kit and responsible for checking a state of the drone body battery; and
a parachute controller for controlling the parachute kit depending on a state of the drone body battery detected by the battery detector,
wherein the parachute kit comprises:
a parachute chamber in which the parachute is disposed;
a parachute cover for covering one side of the parachute chamber;
a parachute support disposed on another side of the parachute chamber and responsible for supporting the parachute; and
a parachute pressurizer for selectively applying pressure to the parachute support,
wherein when the parachute controller receives a parachute unfolding command or when a total charge of the parachute kit battery and the drone body battery is 0, the parachute pressurizer pressurizes the parachute support,
wherein the parachute pressurizer comprises:
a spring accommodating chamber for accommodating a compressed spring;
a parachute support holder for selectively holding the parachute support so that the parachute support keeps the spring compressed; and
a servomotor for selectively rotating the parachute support holder,
wherein the parachute support has an upper surface and a lower surface,
wherein a parachute support hole is formed in a center of the parachute support,
wherein the parachute support holder includes a first end and a second end,
wherein the first end of the parachute support holder is connected to the servomotor and the second end of the parachute support holder is disposed on the upper surface of the parachute support while the parachute support keeps the spring compressed, and
wherein, when the servomotor rotates the parachute support holder at a predetermined angle while the parachute support keeps the spring compressed, the second end of the parachute support holder passes through the parachute support hole to be positioned below the lower surface of the parachute support, and the spring is decompressed.

9. A method of controlling drones, wherein the method controls a drone provided with a parachute kit detachably coupled to a drone body, and comprises checking a charge of a battery of the drone body;
determining whether the charge of the battery of the drone body is less than or equal to a predetermined value;
checking a charge of a battery of the parachute kit when the charge of the battery of the drone body is less than or equal to the predetermined value;
determining whether the drone is capable of reaching a destination using a total charge of a remaining charge of the battery of the drone body and a remaining charge of the battery of the parachute kit; and
performing control so that electricity is supplied from the parachute kit battery to the drone body battery upon determining that the drone is capable of reaching the destination using the total charge, and performing control so that a parachute of the parachute kit is unfolded upon determining that the drone is incapable of reaching the destination using the total charge.

* * * * *